March 2, 1948.                  W. DUBILIER                   2,436,857
                 CONTAINER AND TERMINAL FOR ELECTRICAL DEVICES
                            Filed June 22, 1943
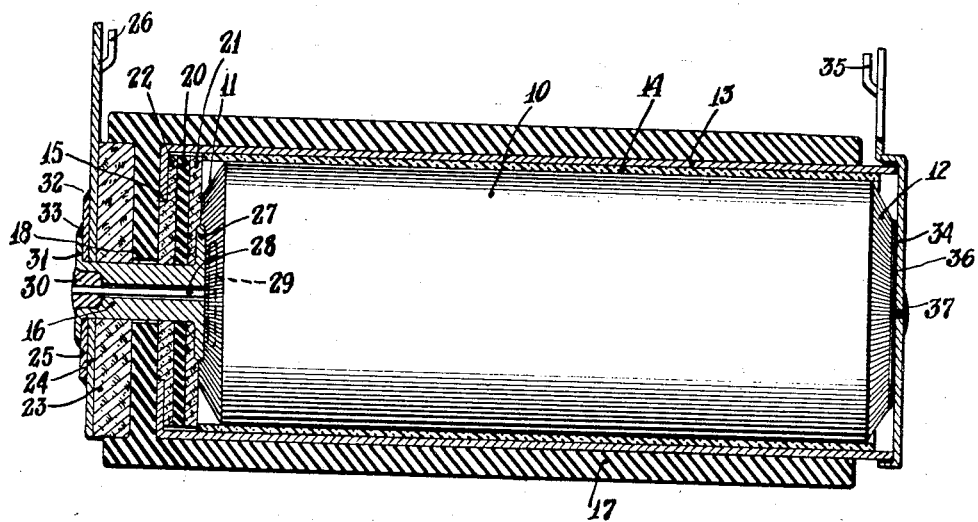
INVENTOR.
William Dubilier
BY
ATTORNEY Patented Mar. 2, 1948

2,436,857

UNITED STATES PATENT OFFICE 2,436,857

CONTAINER AND TERMINAL FOR ELECTRICAL DEVICES

William Dubilier, New Rochelle, N. Y., assignor to Cornell-Dubilier Electric Corporation, South Plainfield, N. J., a corporation of Delaware Application June 22, 1943, Serial No. 491,783

1 Claim. (Cl. 174—77)

My invention relates to fixed electrical capacitors and other electrical devices mounted in a hermetically sealed casing, more particularly to capacitors of the type constituted by a plurality of interleaved electrode foils and insulating strips of paper or the like, known as wound or roller capacitor units and a method of manufacturing the same.

While the invention will be described with specific reference to electrical capacitors of a special type, it will become evident that the novel features thereof may be employed with equal advantage in the construction of other electrical devices subject to similar conditions and problems in manufacture and operation.

In radio and other electrical apparatus, capacitors of the above type and small size are extensively used as by-pass capacitors, filter capacitors, blocking capacitors and for other purposes where space and bulk are at a premium.

In the manufacture of electrical capacitors of the above and similar character and especially those intended for use under adverse atmospheric conditions, such as heat or cold and moisture as encountered on airplanes and in hot and damp climates, temperature changes from −40° to +90° C. are not uncommon and have to be envisaged and considered as a basic design feature and requirement in the manufacture of such capacitors.

When stored before use or during actual operation, the capacitors may be exposed to high humidity for long periods in addition to extreme conditions of heat and cold or ambient temperature changes. For this reason, tests specified by users of capacitors of the above type usually require water immersion cycles in addition to rigorous tests under extreme heat and cold conditions. Under these conditions, the different materials used having unequal temperature coefficients are likely to result in open spaces, voids, cracks or the like which in turn will cause absorption of moisture, gases and other foreign agents penetrating into the interior of the capacitor and resulting in an immediate or gradual deterioration and final breakdown as is well known to those skilled in the art.

It has therefore become necessary to construct capacitor units with long creepage paths or surfaces and for this purpose insulating casings have been used for supporting and enclosing the capacitor units. One of the difficulties in this connection has been in structurally combining the insulating casing with or properly mounting therein metallic terminal structures for the capacitor which were both easy to manufacture and moistureproof under the adverse operating conditions pointed out hereinabove. For this and other reasons, great difficulties have been experienced by manufacturers in designing small units to comply with the rigid operating conditions and requirements.

On the other hand, capacitors mounted in metallic casings provided with insulated ends or terminals have been used successfully, but these did not provide sufficiently long leakage paths or surfaces between the casing and the terminals and usually two insulated terminal joints were necessary which could not be spaced to provide a sufficient leakage path due to the smallness of the units.

Accordingly, it is an object of my invention to provide a capacitor structure of the character specified whose capacity and other electrical characteristics will remain substantially constant over a wide range of temperature, for example from −40° to +90° C.

A further object is to provide a capacitor or other electrical device mounted in a metal container provided with at least one terminal structure hermetically and insulatingly mounted therein and characterized by sufficiently long inner and outer leakage paths between the metal parts of opposite polarity without the use of large projecting insulators and other structures.

Another object is the provision of a capacitor structure comprising a rolled capacitor section or unit mounted in a liquid and gas tight casing with sufficiently long leakage paths between the metal parts at opposite electrical polarity to insure safe operation under the most adverse operating conditions as pointed out above, while affording at the same time a rugged and compact structure and an efficient and permanent seal for the capacitor unit.

Another object is to provide a capacitor of the above character which is both simple in construction and substantially insensitive to mechanical, heat and other influences during operation liable to affect the mechanical and electrical characteristics thereof.

The above and further objects of the invention will become more apparent from the following description taken in reference to the accompanying drawing forming part of this specification and which shows a cross-sectional view through a capacitor structure embodying the principles of the invention.

With the above mentioned objects in view, my invention involves basically the employment of a first insulating, preferably cup-like, and relatively heavy member or casing having an open end and a relatively small aperture in the bottom or end wall thereof for passing a terminal lead or structure. Into this insulating member is tightly fitted in contacting relation therewith a relatively thin metallic and preferably also cup-like casing having a larger aperture in the bottom or end wall thereof and housing a capacitor or other electrical device. Said openings are sealed about said terminal structure by a flexible insulating washer assembly or the like which is both heat and moistureproof and substantially devoid of mechanical contraction and expansion, whereby to avoid cracks and breakage of the seal under the extreme operating conditions pointed out above.

Referring to the drawing, I have shown at 10 a wound or rolled capacitor section comprising in a known manner a plurality of interleaved metallic foil and insulating strips such as paper, wound into a convolute roll or spiral with the metallic foil edges alternately projecting from the opposite ends of said roll to constitute what is generally known as a non-inductively wound capacitor section or unit. The projecting foil ends of opposite polarity as shown at 11 and 12 are connected together by welding, soldering or in any other manner and are provided with suitable terminal leads or structures projecting therefrom and serving to connect the capacitor in an electrical circuit.

According to the present improvements, the capacitor section 10 is mounted in a relatively thin cup-shaped metal container 13 preferably with an insulating spacer in the form of a paper or cardboard tube 14 interposed between the section and the container to provide a snug fit and to insulate the section from the container. The latter is provided with a relatively large central opening 15 in the bottom or end wall thereof for passing a suitable terminal lead or structure such as an eyelet or rivet 16 as shown in the drawing and to provide a sufficiently long inner leakage path between the casing 13 forming one terminal and said rivet forming the other terminal of the capacitor.

The cup-shaped metal casing 13 is in turn inserted in a relatively heavy insulating cup 17 of molded plastic or any other suitable insulating material, both cups 13 and 17 being in contacting relation and being advantageously bonded or united by a varnish or similar material to provide a liquid or moisture-proof joint between the two casings. The insulating cup 17 is similarly provided with a central opening 18 for passing the shank of rivet 16, said opening having a smaller diameter compared with the opening 15 in the cup 13.

In order to provide a hermetic seal for the terminal structure, I have shown a composite washer interposed between the section 10 and the inside end walls of cups 13 and 17, said washer comprising a central portion 20 of relatively rigid insulating material such as a molded plastic or the like and outer portions 21 and 22 of relatively flexible or yielding material, such as rubber or preferably cork which may be bonded or connected to the central section by means of a varnish or in any other suitable manner. Composite laminated washers or sheet material of this type are obtainable on the market, but it is understood that separate washer elements may be used if desired. The outer bottom surface of the insulating cup 17 is preferably formed with a depression adapted to receive a further flexible washer 23 of cork or the like. A metal washer or tab 24 overlies washer 23, said tab being provided with a projecting terminal or soldering lug 26. A final metal washer 25 completes the terminal assembly which is firmly and tightly held or clamped by the rivet or eyelet 16 in the manner shown in the drawing.

The rivet 16 may be either solid in which case the mechanical engagement of its inner flange 27 with the projecting foil ends 11 of the capacitor unit will provide electrical contact connection from the capacitor unit to the terminal. Alternatively, the rivet 16 may be of the hollow type as shown in the drawing for passing a connecting wire or lead 28 having its inner end formed into a loop 29 soldered to or otherwise embedded in the foil ends 11 and having its outer end connected to the rivet 16 by a small mass 30 of solder or other conducting material filling the outer enlarged portion of the rivet perforation and completely sealing the inside from the outside of the container. In order to further improve the mechanical resistance of the joint and seal for the terminal, the washer 25 and the outer flange 31 of rivet 16 are soldered together and to the tab or washer 24 as indicated at 32 and 33, respectively.

In this manner there is obtained a permanent end hermetic joint and sealed terminal between the foil ends 11 of one polarity and the connecting terminal 26, while providing at the same time a mechanically rugged casing capable of withstanding rough handling and mechanical shocks and vibration substantially without danger to the terminal joint and seal. At the same time, the seal structure comprises substantially materials of low thermal coefficient of expansion such as a molded plastic, cork, or the like, whereby to insure an efficient and permanent seal under adverse operating conditions and temperature changes.

The opposite end of the section 10 is sealed and provided with a terminal of opposite polarity by the provision of a metal cap 34 placed over and soldered to the open end of the metal casing 13. The latter for this purpose projects beyond the insulating casing, said cap being provided with an extending terminal lug 35 similar to the terminal 26. In order to insure efficient electrical contact between the foil ends 12 and the cap 34, a metal tab or the like 36 is shown interposed between the foils and the inner surface of cap 34.

After the capacitor has been assembled, it is usually subjected to impregnation with oil or wax in a vacuum, for which purpose cap 34 is shown provided with a central opening closed after the completion of the impregnating process by filling with solder as shown at 37.

There is thus provided by the invention a hermetically sealed housing for a capacitor or other electrical device comprising substantially a relatively thin metal casing enclosing the capacitor unit and acting as one terminal for the capacitor, and a further relatively heavy insulating member enclosing said metal casing in contacting relation therewith and serving as an insulator and support for the hermetically sealed other terminal of the capacitor or equivalent device. Both casings are preferably sealed such as by the provision of a varnish layer or the like filling the space between the casings to avoid penetration of moisture, gases or other objectionable agents along the space between the casings and to protect the inner leakage path between the edge of opening 15 and the rivet or other terminal 16 and the hermetic seal between the casing and the terminal.

The cups or casings 13 and 17 are preferably longer compared with their cross-sectional dimension, whereby to provide a sufficient external leakage path between the projecting terminal and the metal casing and resulting in a large contact surface between the casings whereby to further minimize or eliminate moisture penetration. By a construction of this type a similar effect is obtained as when large insulating structures with projecting fluted or otherwise increased surfaces are used to insure sufficient leakage or creepage distance such as in the case of the well known porcelain insulators employed in connection with high voltage electrical devices. Accordingly therefore, the invention results in the elimination of bulky and projecting insulator structures with corresponding considerable saving of space and reduction of costs and elimination of other drawbacks and defects encountered with large porcelain and similar insulator structures.

It will be evident from the foregoing that the invention is not limited to the specific details and arrangements of parts shown and disclosed herein for illustration but that the underlying principle thereof will be susceptible of variations and improvements coming within the broader scope and spirit of the invention as defined by the appended claim. The specification and drawing are accordingly to be regarded in an illustrative rather than a limiting sense.

I claim:

The combination with a high tension electrical device, of a leak-proof housing comprising a relatively thin cylindrical metal container enclosing said device and forming a terminal of one polarity for said device, said container having an end wall provided with a central opening, a relatively heavy cup-shaped insulating member having an end wall provided with a central opening of substantially smaller diameter than said first opening, said metal container being disposed in said insulating member in snug fitting engagement of both the cylindrical and end wall portions of said container and member, a rivet terminal of opposite polarity having an inner flange in electrical connection with said device and having a shank portion passing through said openings, first washer means encircling said shank portion between said flange and the end wall of said container, said washer means comprising a central portion of relatively rigid insulating material and outer portions of relatively flexible insulating material, further insulating washer means encircling said shank portion and engaging the outside of said member, said first and second washer means being clamped by said rivet into engagement with said openings to provide a hermetic seal for said terminal, said insulating member extending over a substantial length of said container towards the opposite end thereof.

WILLIAM DUBILIER.

REFERENCES CITED

The following references are of record in the file of this patent:

UNITED STATES PATENTS

| Number | Name | Date |
|---|---|---|
| 1,599,859 | Wilson et al. | Sept. 14, 1926 |
| 1,726,543 | Curtis et al. | Sept. 3, 1929 |
| 2,052,700 | De Lange | Sept. 1, 1936 |
| 2,290,304 | Waterman | July 21, 1942 |
| 2,315,592 | Carghill | Apr. 6, 1943 |

FOREIGN PATENTS

| Number | Country | Date |
|---|---|---|
| 587,447 | Germany | Nov. 3, 1933 |